United States Patent [19]
Reed et al.

[11] Patent Number: 5,572,720
[45] Date of Patent: Nov. 5, 1996

[54] METHOD OF EXTENDING CAPACITY OF A MICROPROCESSOR TIMER

[75] Inventors: Raymond B. Reed, Noblesville, Ind.; Sandesh Malpure, Novi, Mich.; Larissa C. Chu, Kokomo, Ind.

[73] Assignee: Delco Electronics Corporation, Kokomo, Ind.

[21] Appl. No.: 373,690

[22] Filed: Jan. 17, 1995

[51] Int. Cl.⁶ .................................................. G06F 1/14
[52] U.S. Cl. .................. 395/555; 364/270; 364/270.1; 364/270.2; 364/DIG. 1; 395/557
[58] Field of Search ........................... 395/550, 775; 364/270, 270.1, 270.2, 270.3, 270.4

[56] References Cited

U.S. PATENT DOCUMENTS 5,058,050 10/1991 Ogita ........................ 395/550
5,233,573 8/1993 Bettelheim et al. .................. 368/113
5,301,335 4/1994 Langan et al. ...................... 395/775
5,325,341 6/1994 Viot et al. .......................... 368/113

*Primary Examiner*—Thomas M. Heckler
*Assistant Examiner*—Dennis M. Butler
*Attorney, Agent, or Firm*—Mark A. Navarre

[57] ABSTRACT

A timer unit of a microprocessor has a hardware timer limited to the size of its register, and microcode instructions in the timer unit increment a second register when the timer register rolls over to a clear state. The contents of the two registers are concatenated to obtain an extended timer value. A delay in processing the increment of the second register can cause non-coherency of the two registers. By setting a flag when the increment occurs and detecting from the hardware register value whether rollover has occurred, it is logically decided from the flag and the rollover information whether the registers are non-coherent and if so, a correction is made in the value used from one of the registers.

9 Claims, 3 Drawing Sheets

METHOD OF EXTENDING CAPACITY OF A MICROPROCESSOR TIMER

FIELD OF THE INVENTION

This invention relates to microprocessors and particularly to a method of extending the capacity of a timer beyond the register size allowed by a hardware timer.

BACKGROUND OF THE INVENTION

A microprocessor of the kind, for example, which are used in automotive engine controls and a wide variety of other applications is capable of carrying many control functions at the same time by interleaving the operations of the various functions. Generally the microprocessor has to receive signals representing time events, and respond to the signals by outputting other signals, also often critically timed to control engine functions such as spark timing and fuel injection. Such microprocessors may employ a timer processor unit (TPU) which has several channels individually programmed to deal with the various timed signals.

Such a timer processor operates independently of but under the control of a central processor unit (CPU) and must, among other functions, be able to provide time data to the CPU. Both the CPU and the TPU are driven by a system clock which operates at megahertz rates to rapidly step each unit through its program functions. A random access memory (RAM) in the TPU is accessible by the CPU so that time data is obtained by addressing registers in the RAM where the TPU has placed the relevant information. The microprocessor architecture defines the registers of a uniform size, for example 16 bits. One or more timers in the TPU is used to regulate the various channels.

For each timer, one of the registers is driven by the system clock to serve as a free-running counter, called a hardware timer, which rapidly accumulates counts up to its limit and then rolls over to a clear state and continues counting, repeating this process continuously. At any moment the timer value can be stored to another register for reading by the CPU or for use by other TPU functions. A limitation of the timer is that it has only the size of the register so that special manipulations are required to manage larger counts. The availability of a larger count is desirable to provide a larger time range or to accommodate faster clock rates for better timer resolution.

It is proposed to control a second register through microcode software in the TPU to increment each time the hardware timer (first register) rolls over to its clear state. Then an extended timer value is achieved by concatenating the values in the second register and the hardware counter. Either the CPU or the TPU can get the extended timer value by reading the two registers. In practice, there can be a delay between the rollover of the first register and the incrementing of the second register. This leads to a short time when the registers are non-coherent, i.e., the first register has been cleared and the second register does not yet indicate that event, so that the combination of the two values in that period would yield an erroneous result.

SUMMARY OF THE INVENTION

It is therefore an object of the invention to extend the capacity of a microprocessor timer in a manner to yield a correct timer value at all times. Another object is to extend the capacity of a timer by combining a hardware timer and a software timer to produce a coherent timer value at all times. An additional object is to obtain such an extended timer value without any additional CPU software.

The TPU of the microprocessor is controlled by microcode which is separate from that used by the CPU, and is able to manipulate the data in a plurality of timer channels to perform time related functions on data stored in the RAM. The functions involve receiving input pulses and suitably responding to them, and outputting pulses at precise times to control various functions, the channel operations being interleaved to effectively achieve parallel processing of the timer channel functions. The timer channel functions are coordinated on the basis of the ever changing timer value. The microcode in the TPU also operates a second timer register for extending the timer value beyond that permitted by the size of the register used by the hardware timer.

The hardware timer is a first register which is continuously incremented by the system clock to define a lower word at each "tick" of the timer, and when it is full it clears or rolls over to begin a new word. The TPU operates a software timer which is a second register that is incremented each time the first register rolls over to define an upper word of timer value; the total timer value being obtained by combining the two words by concatenation. It is vital to assure that the two words are consistent or coherent by guaranteeing that any time the two words are read they both reflect the register status either before rollover or after rollover. It is possible to read split status register values (non-coherence) because a busy TPU may delay incrementing the second register when managing functions of higher priority. This can result in reading the lower word after rollover and reading the upper word before incrementing. On the other hand, the lower word may be captured before rollover and, due to processing delay, the upper word is read after incrementing. In each case, the two words are non-coherent. The microcode then is provided with programs to identify occasions of non-coherence and to adjust the upper word to agree with the status of the lower word.

The two words are coherent nearly all the time; it is necessary to check for coherency only near the time of rollover of the first register. A special rollover flag is set a few counts before rollover and is reset or cleared a few counts after the rollover. The program checks that flag and enters a coherence check if the flag is set and bypasses the check procedure if the flag is clear. Another special flag, an increment flag, is set prior to reaching rollover and is cleared when the second register is incremented, and is used along with the lower word value in determining the relative status of the registers.

When the upper and lower words are read to determine the timer value and the rollover flag is set, the coherency check program then determines from the value of the lower word whether a rollover has just occurred and determines from the increment flag whether an increment has transpired. If both have occurred or if neither have occurred, the words are coherent. If the increment flag is clear and the lower word value indicates no rollover has happened, the value of the upper word to be used must be decremented to agree with the status of the lower word. If the increment flag is not clear and the lower word value indicates rollover has happened, the value of the upper word to be used must be incremented to agree with the status of the lower word. Alternatively, the lower word value could be adjusted instead of the upper word value to achieve coherency.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
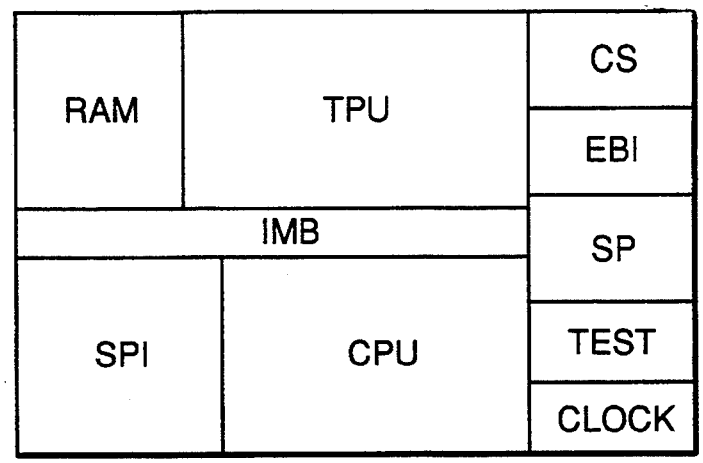
FIG. 1 is a diagram of a prior art microprocessor which is programmable to incorporate the invention.

Referring to FIG. 1, a microprocessor 10, which may for example be a model M68332 manufactured by Motorola Semiconductor Products, Inc., Phoenix, Ariz., which includes a central processor unit CPU, a timer processor unit TPU, an internal module bus IMB, a random access memory RAM, a serial peripheral interface SPI, a clock, and other support modules including a chip select module CS, an external bus interface EBI, a system protect module SP, and a test module TEST. The TPU is a powerful subsystem in the processor and is a 16 bit timer peripheral which provides 16 microcoded channels for performing time-related functions.

Figure 2:
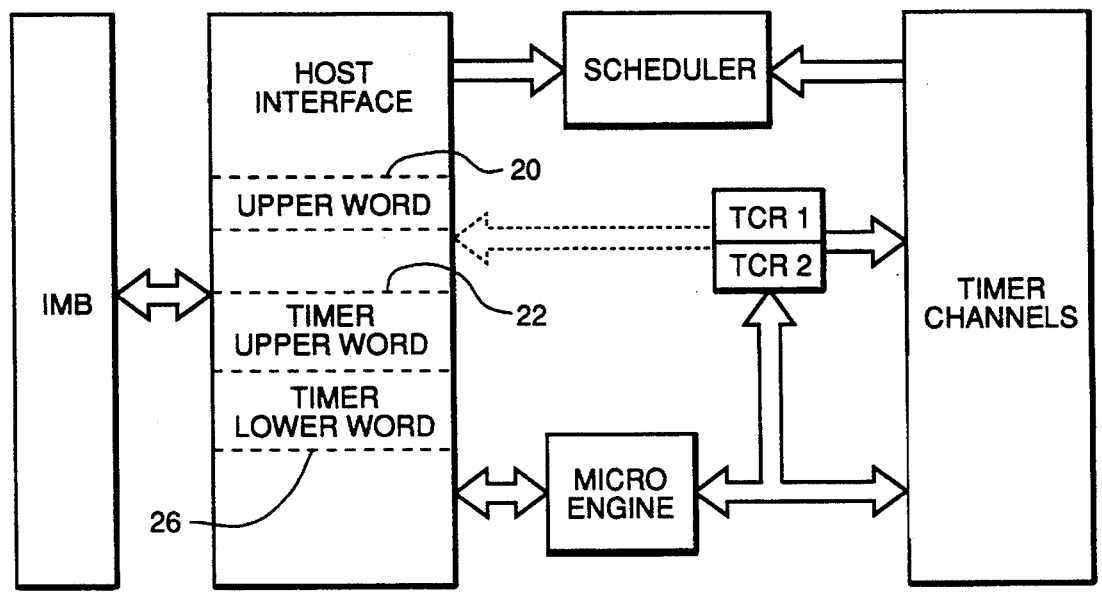
FIG. 2 is a block diagram of a timer processor unit of the microprocessor of FIG. 1 programmed for an extended timer value according to the invention.

FIG. 2 shows further details of the TPU which includes the timer channels, two 16-bit free running timers TCR1 and TCR2 that all timer channels can synchronize to, a micro engine programmed to operate the desired functions, a scheduler for queuing functions according to priority, and a host interface. Either one of the timers is software selected for operation with a software extension to generate a timer value larger than 16 bits. Since the registers are 16 bits, the addition of a software extension to the hardware register can result in a total timer value of 32 bits; alternatively only part of the extension register may be used if a smaller timer value, say, 24 bits is desired. Since only one of the timers is selected for operation in the extended mode, only one timer, TCR, is referred to hereinafter.

The host interface includes a 16 bit upper word register 20 which is incremented approximately when the selected timer TCR rolls over to a clear value, a timer upper word register 22 which receives a buffered value of the upper word, and a timer lower word register 26 which receives a value from the timer when timer access is commanded. The particular time that the upper word register is incremented in response to a timer command or request is determined by the scheduler in view of the priority of other instructions which are competing for processing.

Figure 3:
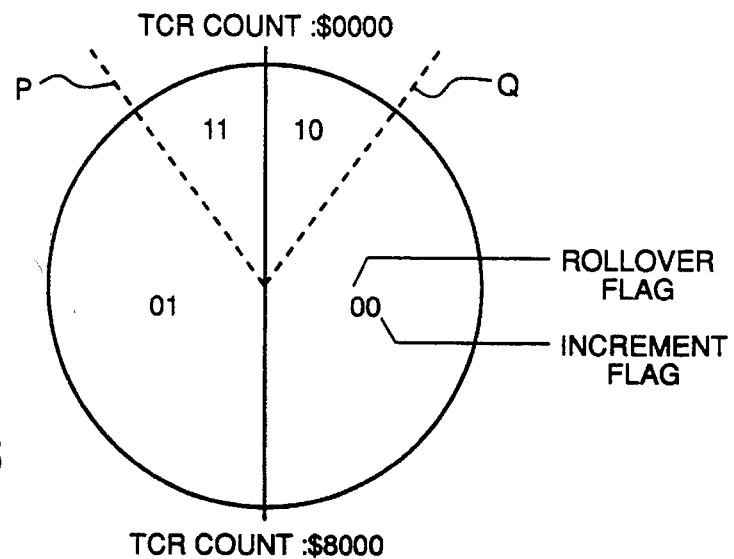
FIG. 3 is a timer diagram illustrating flag settings.

Upon receiving a timer value request, the TPU immediately captures the timer value and stores it in the timer lower word register 26, and stores the contents of the upper word register 20 in the timer upper word register 22. Because the incrementing of the upper word register may be delayed for a short time after the rollover of the hardware timer, the timer upper and lower words in the interface may be non-coherent or out of synchronization. Two timer channel flags are used in determining whether there is non-coherence. FIG. 3 represents the changing value of the hardware timer as a circle increasing in value clockwise starting at $0000 at the top, $8000 at the bottom, and $FFFF at the top just before changing to $0000. As a matter of convention, the timer is said to be positive as it is advancing from $0000 to $8000 and negative as it further proceeds to $FFFF. A first flag, here called an increment flag, is set to a value of 1 at $8000 and is cleared when the second register increments at or just after $0000. A second flag, here called a rollover flag, is set just a few counts, say, 20 counts before rollover at point P in the timer cycle and is cleared a few counts after rollover at point Q. The rollover flag is set only when the timer is near rollover and since non-coherency can occur only in the region of rollover, a coherency check is not necessary when this flag is clear.

Figure 4:
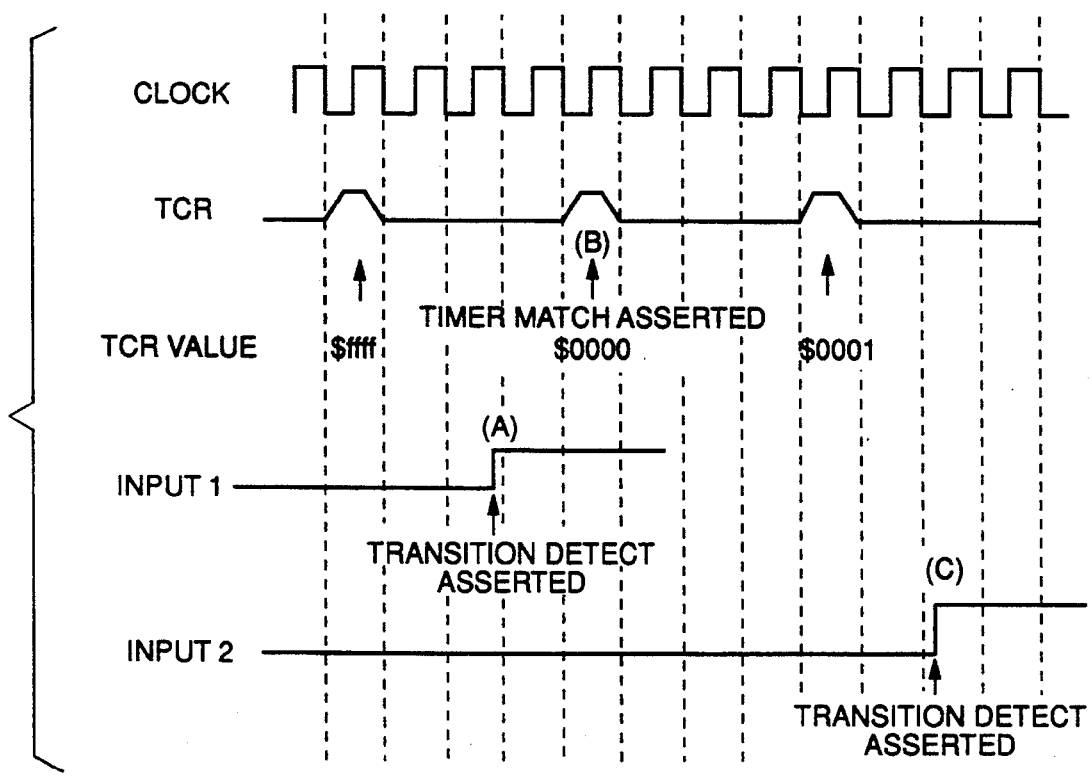
FIG. 4 is a timer diagram for the region of hardware timer rollover.

A more detailed illustration of events at the time of rollover is shown in FIG. 4. The timer TCR is advanced one count at every fourth microcycle of the system clock. Thus the timer value changes from $FFFF to $0000 to $0001. Operations which can be executed immediately are match and capture and a corresponding flag is set for each. For an exemplary scenario, events A, B and C occur in sequence. Event A is a rising edge of Input 1 signal and event C is a rising edge of Input 2 signal. The transition detect is asserted at each of those times, the TCR value is immediately captured in a register, and a flag is set to request servicing of the input capture. Event B occurs when the count reaches $0000 and a timer match is asserted for incrementing the second register. The function triggered by event A is still running when event C occurs, and the servicing of events B and C is delayed. After event A is done, the TPU may start event C next due to priority scheduling. The capture register for event C will have captured the lower word value of $0001, however it sees the old value for the timer upper word because event B has not run yet to increment the upper word. Thus this non-coherent condition must be recognized and corrected by incrementing the buffered value of the upper word.

In still another scenario, not illustrated, a timer match is asserted at $0000 and serviced immediately, and an input capture event occurring at about the same time is serviced next; due to subtleties of bus timing, if a timer value is written in one microcycle by one timer channel and read in the next microcycle by another timer channel, the old value is read. In that case, the lower word will be read as $FFFF and the upper word will have already been incremented. Thus it is necessary to recognize this condition and decrement the buffered value of the upper word. This occurs, for example, for the case of an input capture or an output compare function. On the other hand, a CPU request for the timer value is handled by one channel and the timing anomaly does not occur.

Figure 5:
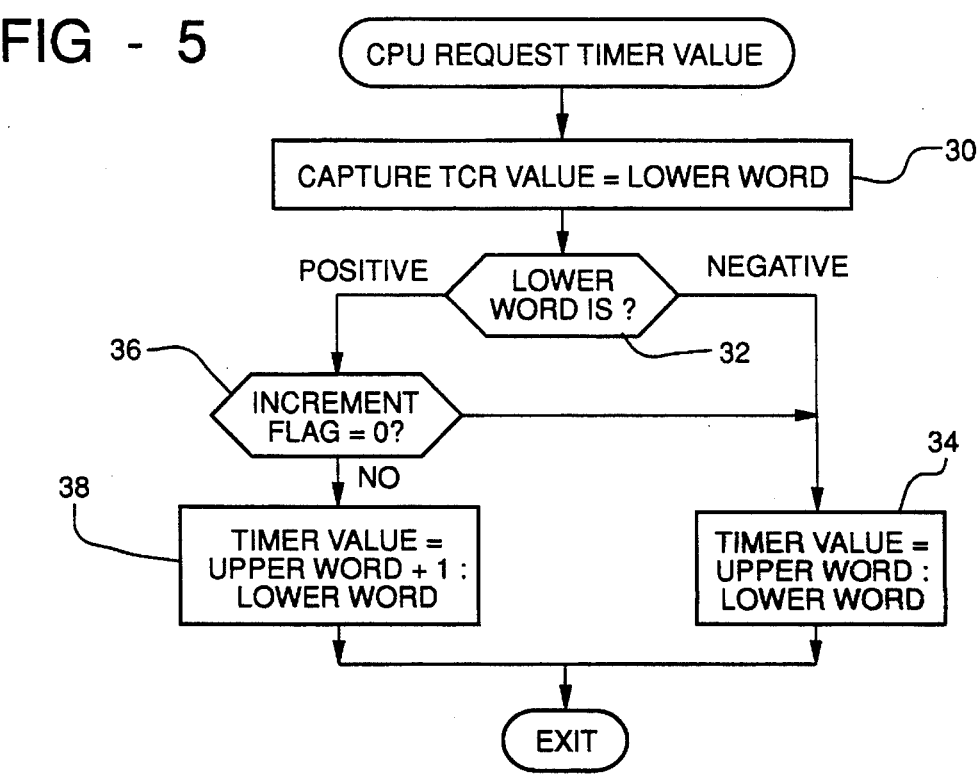
FIG. 5 is a flow chart representing a TPU program for guaranteeing coherency for a CPU timer value request.
Figure 6:
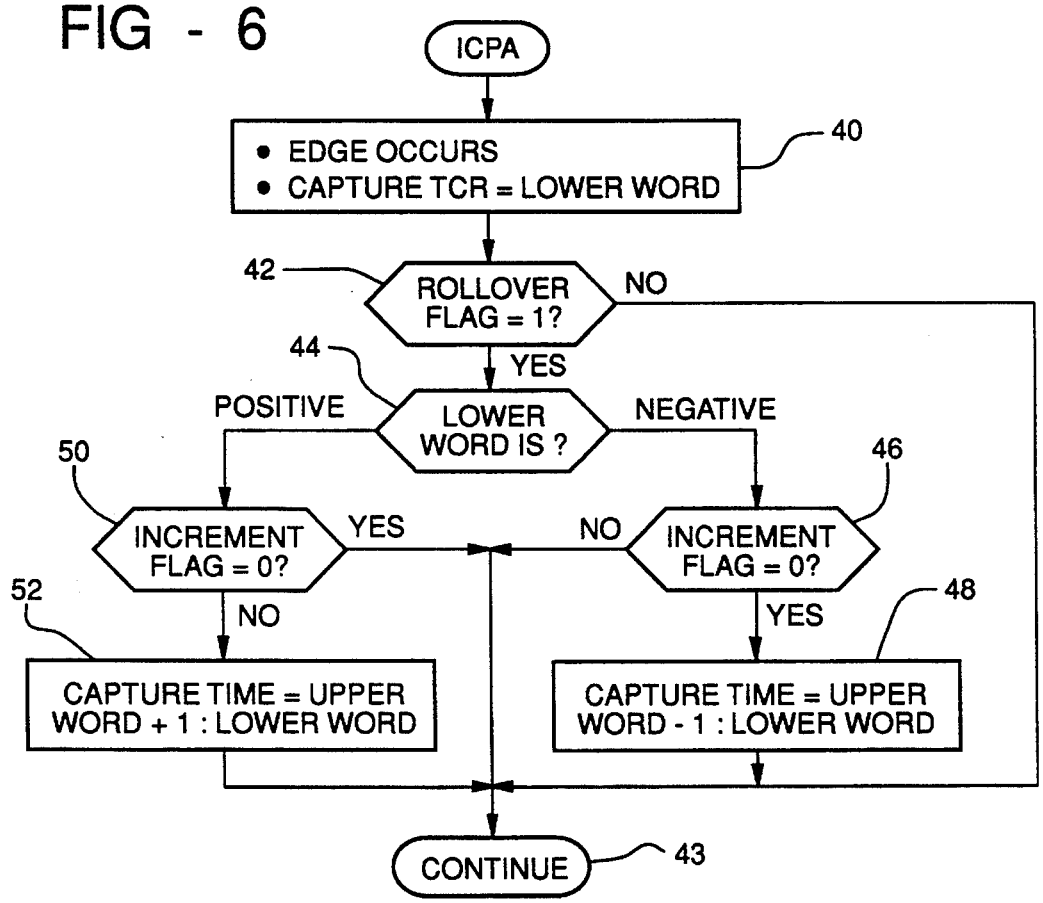
FIG. 6 is a flow chart representing a TPU program for guaranteeing coherency for an input capture function.

The flow charts of FIGS. 5 and 6 represent programs contained in microcode in the TPU for quaranteeing coherency. The description of the flow charts contains numerals in angle brackets <nn> which refer to functions in blocks with corresponding reference numerals. FIG. 5 is directed to an event wherein the CPU requests the timer value. When that request is received at the host interface the micro engine causes the TCR value to be written to the timer lower word value register in the host interface <30>. The upper word register in the interface will already contain the upper word as of the last update. If the lower word value is negative (between $8000 and $FFFF) <32> the upper word is copied into the timer upper word register and the timer value is the upper word concatenated with the lower word <34>. If the lower word is positive <32> and the increment flag is 0 <36> the block 34 instruction pertains, but if the increment flag is 1, one is added to the value of the upper word and written to the timer upper word register and then concatenated with the lower word <38>.

FIG. 6 is directed to an input capture operation, although the logic is the same for an output compare operation. When an edge occurs on an input signal the TCR value is captured and the lower word is set to that value <40>. If the rollover flag is clear <42>, the coherency test is bypassed and the normal input capture procedure continues <43>. If the rollover flag is set, and the lower word is negative <44>, the increment flag is tested. If it is clear <46>, the value of the upper word is decreased by one and written to the timer lower word register, and the capture time is set at the buffeted upper word concatenated with the lower word <48>. If the increment flag is 1, the timer words are coherent and the input capture procedure continues <43>. Where the lower word is positive <44>, and the increment flag is not clear <50>, the value of the upper word is increased by one and concatenated with the lower word <52> to yield the capture time. If the increment flag is 0 <50> the input capture procedure continues <43>.

It will thus be seen that the hardware timer of a microprocessor is readily extended in software by incrementing a second register for each rollover of the hardware register and assuring that the two registers are coherent even at the time of rollover and incrementing. The coherency is assured for either a CPU read request or a timer command by a simple algorithm embodied in microcode in the timer processor unit, there being no additional burden to the CPU.

We claim: The embodiments of the invention in which an exclusive property or privilege is claimed are defined as follows:

1. In a timer unit of a microprocessor having a hardware timer comprising a first register of fixed capacity, a software method of extending the timer capacity comprising the steps of:

detecting rollover of the first register;

incrementing a second register in response to detection of rollover of the first register;

upon reading the timer, checking the first and second register values for non-coherency;

when non-coherency is detected, adjusting one of the register values to achieve coherency; and concatenating the first and second register values to represent the lower and upper words, respectively, of timer value.

2. The invention as defined in claim 1 including the steps of:

assigning a given state to a flag only while the first register value is within a set number of counts of a rollover event;

when the flag has the given slate, checking the register values for non-coherency and making corrections for coherency before the concatenating step; and when the flag does not have the given state, bypassing the coherency test.

3. The invention as defined in claim 1 wherein the step of checking for non-coherency includes the steps of:

capturing the first register value;

determining from the captured value whether the first register has just rolled over;

determining whether the second register has just been incremented; and detecting non-coherence where the states of the two registers are inconsistent.

4. The invention as defined in claim 1 wherein the step of adjusting one of the register values to achieve coherency comprises the steps of:

capturing the first register value;

determining whether the captured value is positive or negative;

setting a flag to a given state when the second register is incremented;

when the captured value is negative and the flag is in the given state, using a value one less than the second register value to bring the states into coherence.

5. The invention as defined in claim 1 wherein the step of adjusting one of the register values to achieve coherency comprises the steps of:

capturing the first register value;

determining whether the captured value is positive or negative;

setting a flag to a given state when the second register is incremented;

when the captured value is positive and the flag is not in the given state, using a value one greater than the second register value to bring the states into coherence.

6. In a microprocessor having registers and a timer unit for continuously incrementing a first register and incrementing a second register upon rollover of the first register, wherein the contents of the two registers combined represents a time value, a method of assuring that the registers are coherent when read comprising the steps of:

setting a flag prior to rollover of the first register;

in response to rollover, incrementing the second register and simultaneously clearing the flag;

upon a timer request,
      reading the first and second registers,
      reading the flag,
      if the first register value is positive and the flag is not clear, incrementing the value read from the second register and combining it with the value read from the first register to obtain the timer value;

whereby the two parts of the timer value are coherent when the registers are read after the first register rollover and before the second register increment.

7. The invention as defined in claim 6 including the alternative step of combining the values of the first and second registers to obtain the timer value if the first register value is positive and the flag is clear.

8. The invention as defined in claim 6 including the further step of:

if the first register value is negative and the flag is clear, decrementing the value read from the second register and combining it with the value read from the first register to obtain the timer value, whereby the two parts of the timer value are coherent.

9. The invention as defined in claim 8 including the further step of combining the values of the first and second registers to obtain the timer value if the first register value is negative and the flag is not clear.

* * * * *